March 10, 1959     G. L. HENLEY     2,876,560
CONCEPT BUILDING DEVICE FOR TEACHING MATHEMATICAL
AND OTHER RELATIONSHIPS
Filed June 27, 1955
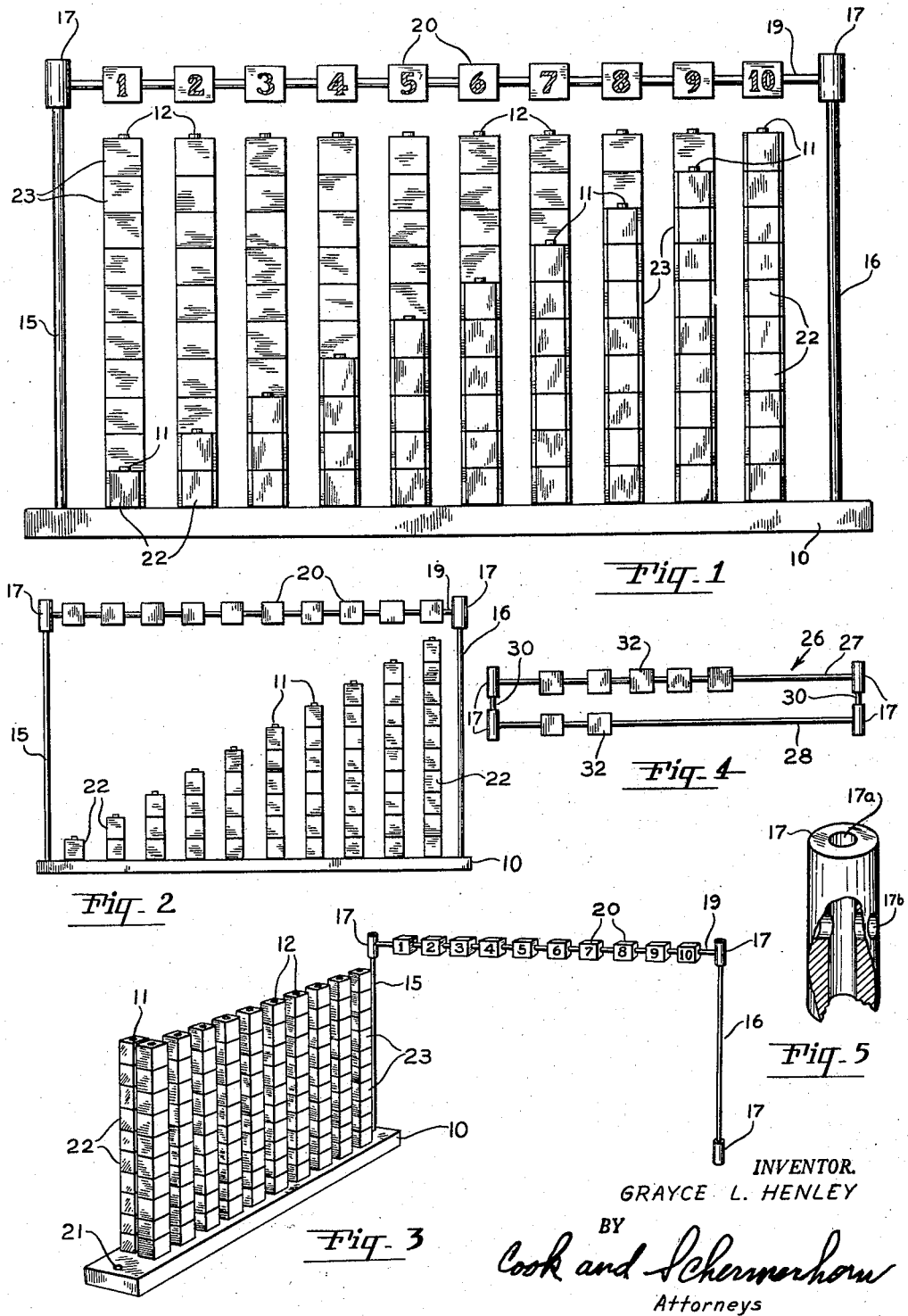
INVENTOR.
GRAYCE L. HENLEY
BY
Cook and Schermerhorn
Attorneys

_____

United States Patent Office 2,876,560
Patented Mar. 10, 1959

_____

2,876,560

CONCEPT BUILDING DEVICE FOR TEACHING MATHEMATICAL AND OTHER RELATIONSHIPS

Grayce L. Henley, Portland, Oreg.

Application June 27, 1955, Serial No. 518,019

7 Claims. (Cl. 35—32)

This invention relates to an educational device, and more particularly relates to improvements in devices employing manipulable means for teaching fundamental concepts of mathematics and relationships.

A principal object of the present invention is to provide an improved device by means of which a teacher can more readily introduce fundamental concepts of mathematics and relationships to children.

A further object is to provide an improved device for teaching fundamental concepts which is simple in structure and operation and which may be manipulated by children, if desired.

A still further object is to provide an educational device composed of a number of parts which can be used individually and in different combinations for teaching various fundamental concepts.

More specific objects are to provide a device having means to assist children in the recognition of the various digits and to coordinate the visual and aural identification thereof, as well as to coordinate a digit with its designated number of physical objects; to provide a novel device for teaching colors, dimensional proportions of objects, addition, subtraction, fractions, multiplication and division, positional or place value of numbers, carrying and borrowing; and to provide a novel apparatus which is manipulable as a game device.

The above objects are accomplished by a device having a plurality of vertical removable dowel rods for mounting thereon, in columnar relation, blocks which are used to teach various mathematical principles and other relationships. The dowel rods are disposed in front and rear rows and are of common height in the rear row and of variable height in the front row for establishing comparative relationship between stacks of blocks mounted thereon.

Indicating means comprising a structure formed from dowel rods and denominational blocks is disposed over the front row for numerically indicating the number of blocks on the vertical dowel rods in said row as well as for indicating the fractional relationship of aligned columnar members in the two rows. The indicating means is removable from said device and may be used as a manipulator for the teaching of various concepts apart from the main device. Spool connectors are utilized in conjunction with some of the dowel rods for assembling said indicating means and for assembling other types of manipulators.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

In the drawings:

Figure 1 is a front elevational view of the present concept building device showing the columnar arrangement and indicating means therefor;

Figure 2 is a view similar to Figure 1 but showing a single row of columns thereon;

Figure 3 is a rear perspective view of the device showing the indicating means positioned transversely to the device for use as a manipulator;

Figure 4 is an elevation view of a modified form of manipulator which may be used individually or in combination with the device; and Figure 5 is a perspective view of a spool connector utilized in assembling the indicating means or various forms of manipulators.

Referring in detail to the drawings, the device comprises a base 10 having thereon a plurality of vertical dowel rods comprising pegs 11 and 12. The pegs 11 are arranged in a front row and are of a variable height, and the pegs 12 are arranged in a rear row and are all of a common height equal to the tallest peg 11. Pairs of pegs 11 and 12 are aligned from front to rear and each of the pegs is preferably removably mounted in the base so that if desired some of them may be used without others.

Mounted on the base 10 adjacent the ends thereof is a pair of dowel rods 15 and 16 forming standards. Spool connectors 17 having axial bores 17a and diametral bores 17b, Figure 5, are mounted on the upper end of standards 15 and 16 and are connected by a transverse dowel rod 19. Slidably mounted on the rod 19 are a plurality of indicator or denominational blocks 20 numbered from 1 to 10. The standards 15 and 16 are preferably removably mounted in apertures 21, Figure 3, in the base 10 whereby the standards and rod 19, as a unit, can be separated from the base 10, and, as will be explained more fully hereinafter, this portion of the device can be used as a manipulator for teaching certain fundamental concepts. Also with such mounting arrangement of the standards 15 and 16, one of the standards may be removed from its base aperture and the assembly pivoted angularly relative to the base as shown in Figure 3. In this position the manipulator may be used without reference to the remaining portion of the device, and is held in upright operative position by the standard remaining in engagement with the base portion 10. A spool connector 17 is mounted on the bottom of standard 16 when the manipulator is disposed in an angular position relative to the base 10 to form a raised support therefor.

Slidably mounted on the vertical pegs 11 and 12 are blocks 22 and 23, respectively, having suitable apertures for engaging the pegs. Blocks 22 are narrower than blocks 23 so that when the device is viewed from the front the height relationship of aligned rows in the two columns can be readily determined. The height of blocks 22 and 23 is, however, identical.

As illustrated, sufficient blocks are employed so that each of the rear pegs 12 is provided with ten blocks. The pegs 11 are variable in height, and each adjoining peg from left to right is one block higher, whereby the first peg receives a single block and the last peg receives ten blocks.

The rod portions of the device, comprising pegs 11 and 12, standards 15 and 16, and indicator rod 19, are of the same size and the spool connectors 17 are readily mounted thereon by means of apertures 17a or 17b in the connectors. Various arrangements of indicators or manipulators may thereby be erected either on the base 10 or apart from the base. Figure 4 discloses a manipulating device 26 comprising a pair of rods 27 and 28 having spool connectors 17 held in assembled relation by short dowels 30 engageable in bores 17a. The rods 27 and 28 are provided with blocks 32 slidable thereon for use in illustrating certain concepts, and these rods may be separated by removal of dowels 30 and used individually. The manipulator 26 may be removably mounted on the top of spool connectors 17 on standards 15 and 16 by short dowels 30 and thus form a part of the main structure, but the principal purpose of the unit 26 is to provide individual instructions and may be furnished to each student.

The present instructional tool may, therefore, be used in fully assembled condition for imparting concepts of mathematics and relationship, and such functions may be accomplished by individual members of the device separated therefrom. Manipulation of the device may be accomplished by the teacher or the student, or both, during the lesson. One of the uses of the device is to teach children to recognize the various digits or number scale and to coordinate the visual and aural identification thereof. This function may be accomplished by explanation and manipulation of the denominational blocks 20 on the rod 19. The rod 19 may be pivoted at right angles to the base 10, if desired, Figure 3, for accomplishing this function so that various other portions of the device will not tend to confuse the children in learning this initial concept. Alternatively, the manipulator may be left in its Figure 1 position and the pegs and blocks thereunder removed.

Another fundamental concept to be taught children is to associate a digit or other numeral with its designated number of physical objects, and this may be done by establishing mentally the connection between the numeral on blocks 20 and the number of respective blocks 22 aligned therebeneath, the back row of pegs 12 and blocks 23 preferably being removed for this operation. This may also be accomplished by giving the child some of the blocks 22 or 23 and then associating a digit with the corresponding number of blocks given to the child. The same function may be accomplished by furnishing the children individually with manipulators 26 and causing the children slidably to move the blocks 32 together or apart as desired to associate a number of blocks with numerals desired. The number of blocks 32 on the rods may vary as desired.

A further fundamental concept is the determination of colors. In order to teach this concept the blocks 22 and 23 are variously colored, and by suitable explanation and manipulation of the blocks, the children may be taught color identification and the composition of complex colors in terms of the primary colors, etc. The individual manipulator 26 may have colored blocks 32 which may be slidably manipulated or arranged as instructions are given.

The present device may be used in various ways to teach addition and subtraction. For example, the progressively increasing height of adjoining columns of blocks 22 can be shown to comprise the addition of one block to the column on the left. Subtraction can be illustrated in a similar manner by moving down the column. Also, the blocks 22 or 23 may be removed from the pegs and arranged and separated in various combinations. Furthermore, slidable manipulation of the blocks 20 on the rod 19 or the blocks 32 on the rods 27 and 28 may be used for such purpose.

Dimensional relations may be easily taught to a child by a comparison of the height of the various columns of blocks 22 or by a comparison of the blocks with the pegs 11.

An introduction to multiplication may be accomplished by placing an identical number of blocks 23 on a number of the pegs 12 and illustrating to the child that a product is obtained by the process of repeating or adding any given number or quantity a certain number of times. For example, three of the pegs 12 may be provided each with three blocks and by proper illustration it can be readily shown that the product nine is obtained by multiplying the number of sets times the blocks in the sets. Various sets of blocks 23 also may be used for introducing a child to division and the relationship of division to multiplication. For example, two blocks 23 may be provided on each of five pegs 12 and then the teacher may associate the total number of blocks with the number of sets of blocks to show that there are five groups of two in ten blocks.

An important feature of the present device is to assist in teaching the fundamentals of fractions. This may be accomplished by comparing the number of blocks on the pegs in the sets of columns aligned from front to rear. For example, with ten blocks on each of the pegs 12, a comparison is made with the number of blocks on each peg 11 in front thereof to establish the fractional relationship whereby the first row illustrates the fraction one-tenth, the second row two-tenths, and so on. The numbers on the denominational blocks 20 indicate the numerators of the fractions. The number of blocks on the pegs 12 may vary so that fractional relationships utilizing different denominators may be used.

The blocks may also be used to introduce positional or place value of numbers to the child. This may be accomplished by designating certain of the pegs 12 to represent the ones, tens, hundreds, thousands, etc., value. Thereupon blocks may be used on said pegs to illustrate the various values indicated; for example, it may be shown that one block on the tens peg is equivalent to ten blocks on the one peg, that one block on the hundreds peg is equivalent to ten blocks on the tens peg, and so on. Furthermore, by similar manipulation, the child may be taught the functions of carrying and borrowing. For example, the various pegs may have blocks thereon which are explained to the children to comprise the various values of tens, hundreds, thousands, etc., and in order to subtract a larger number from a smaller number, one block on the adjoining peg of higher relation must be borrowed. By such explanation and manipulation the student more readily realizes the relationship and values of the various blocks on the pegs, and is, therefore, able to understand the functions thereof which are ordinarily difficult to grasp. Different colored blocks may be used better to illustrate these principles.

A further feature of the present device is to provide a game device operable in various ways for amusing children. As an example, the children are given a few each of the blocks 22 or 23 and one of the children is elected to spin one of the blocks 20 on the rod 19. As the child spins a block 20 he designates a direction of "right or left." The children at their desks move the number of blocks corresponding with the abstract number spun by the child to the right or left, whichever is designated. Any number of simple games may be played which serve the dual purpose of amusing the children and teaching fundamentals.

The present invention thus provides an educational device which has a wide range of numerical applications and demonstrations for imparting elementary mathematical functions and other relationships to children. The functions and relationships are imparted visually and concretely by simple manipulative means and the concepts produced thereby are more easily grasped by the children than by mere explanation or illustration on a blackboard. The device is simply operated and is inexpensive in construction, the parts thereof being constructed of an inexpensive material such as wood, rubber or plastic. The device may be completely disassembled and when so disassembled it may be stored in compact relation or packed in a suitable container. It is to be understood that various other concepts may be illustrated by the present structure, and, furthermore, that the concepts which have been described may be illustrated in still different ways.

Having now described my invention and in what manner the same may be used, what I claim as new and desire to protect by Letters Patent is:

1. An educational device comprising a base having two rows of transversely aligned holes, each of said holes in one of said rows being aligned from front to rear with a hole in said other row, dowel rods mounted in said holes, apertured blocks of uniform height removably mounted on said rods to form a plurality of columns of blocks, said columns of blocks in one of said rows having a common height and said columns of blocks in the other of said rows having diverse heights whereby comparative relationship may be established from front to rear between aligned columns of blocks in the two rows.

2. An educational device comprising a base having two rows of transversely aligned holes, each of said holes in one of said rows being aligned from front to rear with a hole in said other row, dowel rods mounted in said holes, apertured blocks of uniform height removably mounted on said rods to form a plurality of columns of blocks, said columns of blocks in one of said rows having a common height and said columns of blocks in the other of said rows having diverse heights whereby comparative relationship may be established from front to rear between aligned columns of blocks in the two rows, said columns of blocks in the front row being of narrower construction than in the rear row to make said rear row visible when viewed from the front.

3. An educational device comprising a base having two rows of transversely aligned holes, each of said holes in one of said rows being aligned from front to rear with a hole in said other row, dowel rods mounted in said holes, apertured blocks of uniform height removably mounted on said rods to form a plurality of columns of blocks, said columns of blocks in one of said rows having a common height and said columns of blocks in the other of said rows having diverse heights whereby comparative relationship may be established between aligned columns of blocks in the two rows, and denominational means vertically aligned with the columns of blocks of variable height to indicate said relationship between aligned columns in the two rows.

4. An educational device comprising a base having two rows of transversely aligned holes, dowel rods mounted in said holes, apertured blocks of uniform height mounted on said rods to form a plurality of columns of blocks, said columns of blocks in one of said rows having a common height and said columns of blocks in the other of said rows having diverse heights whereby comparative relationships may be established between aligned columns in the two rows, a cross rod above said columns of blocks pivotally supported on said base, and denominational means on said rod, said rod being rotatable between an indicating position for said relationships extending along said rows of dowel rods and an angular manipulative position visually dissociated from said columns of blocks.

5. An educational device for indicating fractional relationships comprising a base having two rows of holes, dowel rods mounted in said holes, apertured blocks of uniform height removably mounted on said rods forming a plurality of columns of blocks, said columns of blocks in one of said rows being of a common height and representing the denominator of said fractional relationship and said columns of blocks in said other row being aligned from front to rear with columns of blocks in said first mentioned row and having blocks ranging in number from one to the number represented by said denominator.

6. An educational device comprising a base having two rows of transversely aligned holes, vertical dowel rods removably mounted in said holes, the rods in one row being of equal height and the rods in the other row progressively varying in height, apertured blocks of uniform height stacked in columns on said rods to the top of each rod, holes in said base at the ends of said rows of holes, vertical dowel rods removably mounted in said last holes, spool connectors on the upper ends of said last dowel rods, a horizontal dowel rod interconnecting said spool connectors, and indicia bearing indicator blocks on said horizontal rod above said columns of blocks.

7. A relationship concept building apparatus comprising a base board having two rows of peg holes and standard holes at the ends of said rows, pegs and standards for said holes, cross rod means extending between said standards, connector blocks having holes for joining said cross rod means with said standards, denominational means on said cross rod, a set of cubical blocks each having a hole therethrough capable of loosely receiving a peg, and a second set of blocks each having a similar hole, the blocks of both sets being of the same height in the direction of the holes and the blocks of the second set being narrower than the blocks of the first set transversely of the direction of the holes so that blocks of the first set are visible behind blocks of the second set when the first set of blocks is mounted on pegs in a rear row of peg holes and the second set of blocks is mounted on pegs in a front row of peg holes, relative to an observer.

References Cited in the file of this patent
UNITED STATES PATENTS

| Number | Name | Date |
| --- | --- | --- |
| 637,964 | Johnson | Nov. 28, 1899 |
| 805,365 | Knappe | Nov. 21, 1905 |
| 1,151,279 | Lewis | Aug. 24, 1915 |
| 1,155,035 | Bostwick | Sept. 28, 1915 |
| 1,329,850 | Pye | Feb. 3, 1920 |
| 1,594,376 | Passmore | Aug. 3, 1926 |
| 1,714,106 | Ropke | May 21, 1929 |
| 2,014,675 | Webster | Sept. 17, 1935 |

FOREIGN PATENTS

| Number | Country | Date |
| --- | --- | --- |
| 49,614 | Switzerland | Oct. 4, 1909 |